United States Patent [19]
Smith

[11] Patent Number: 5,372,465
[45] Date of Patent: Dec. 13, 1994

[54] QUICK CHANGE SPINDLE ADAPTOR FOR TOOL HOLDER

[75] Inventor: D. F. Smith, Rochester, Mich.

[73] Assignee: T. M. Smith Tool International Corp., Mt. Clemens, Mich.

[21] Appl. No.: 49,277

[22] Filed: Apr. 20, 1993

[51] Int. Cl.⁵ .............................................. B23B 31/10
[52] U.S. Cl. .................................... 409/232; 279/8; 279/101; 408/239 A
[58] Field of Search .................. 409/232, 234; 279/8, 279/91, 101, 138, 145, 904; 408/239 R, 239 A

[56] References Cited

U.S. PATENT DOCUMENTS

| | | | |
|---|---|---|---|
| 3,112,117 | 11/1963 | Wahlstrom et al. | 279/8 |
| 3,512,793 | 5/1970 | Botimer | 279/91 |
| 4,710,079 | 12/1987 | Smith et al. | 279/82 |
| 4,834,596 | 5/1989 | Hollifield et al. | 279/8 |

FOREIGN PATENT DOCUMENTS

| | | | |
|---|---|---|---|
| 3008189 | 9/1981 | Germany | 409/234 |
| 127976 | 4/1950 | Sweden | 279/52 |
| 331498 | 7/1930 | United Kingdom | 279/91 |

*Primary Examiner*—Daniel W. Howell
*Attorney, Agent, or Firm*—Howard & Howard

[57] ABSTRACT

The present invention is a tool holder and quick change adaptor which permits very tight tolerances to be kept when operations are being performed while at the same time permitting quick change of the tool holder. The tool holder and quick change adaptor of the present invention employs a cone and conical recess which are dimensioned such that the two mate with surface to surface contact without locking and provide limited deflection of the tool for precise tool operation.

12 Claims, 1 Drawing Sheet

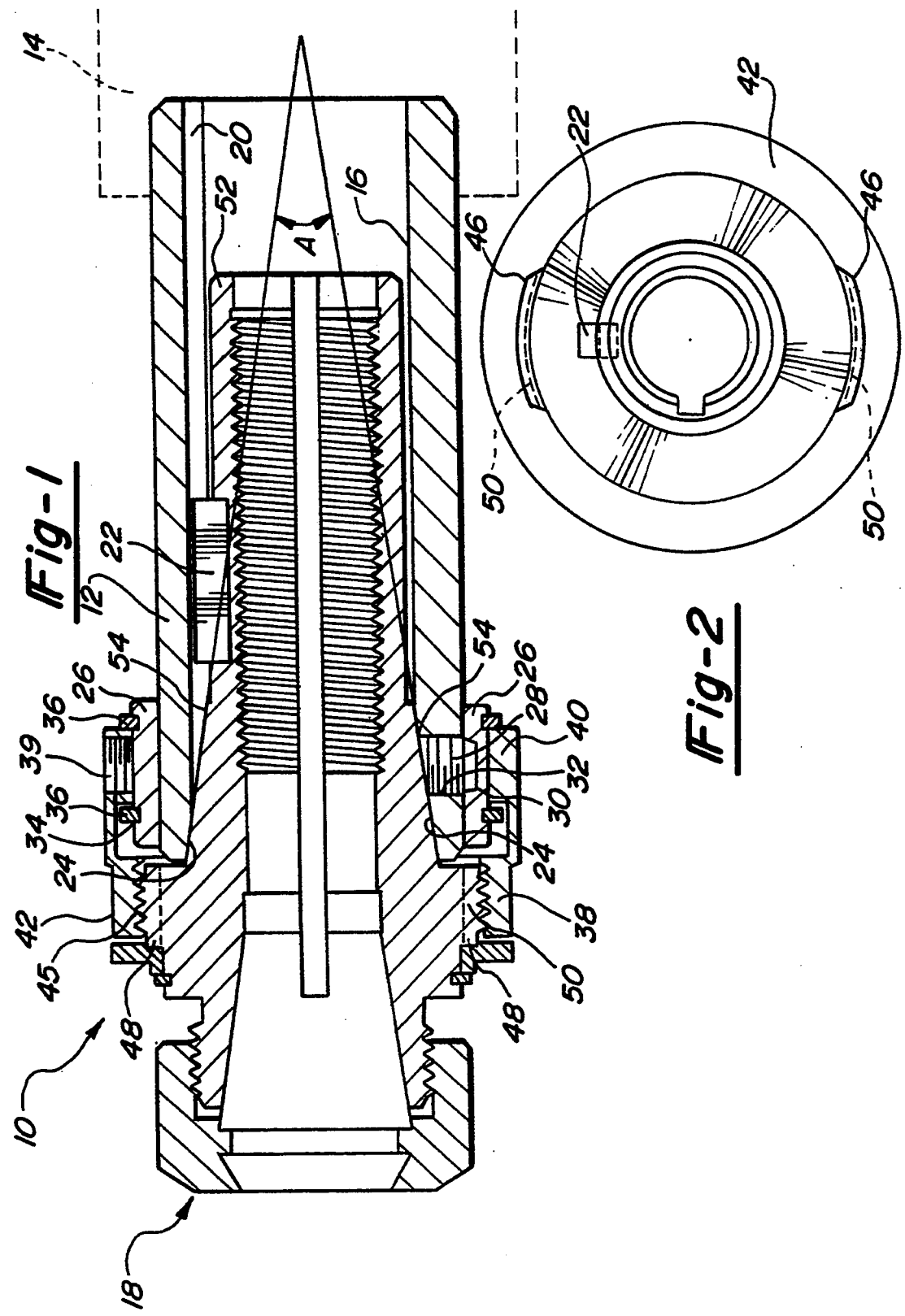

QUICK CHANGE SPINDLE ADAPTOR FOR TOOL HOLDER

BACKGROUND OF THE INVENTION

The present invention relates to an improved tool holder and spindle adaptor that can be quickly changed and can be used in operations that require the hole being formed to be within very precise tolerances. For example, in some hole cutting applications, a hole must be cut with very precise dimensions and must be within very strict tolerances. This requires a tool holder and spindle adaptor that are concentric with little or no deflection from the longitudinal center line of the tool. If the tool holder and spindle adaptor are not concentric, the hole being formed will not be within the desired tolerances and will be unacceptable.

There are tool holders and adaptors that can be used to form critical cuts and maintain very strict tolerances. One difficulty with these tool holders and adaptors is that they typically employ a locking taper in order to maintain the necessary concentricity. A locking taper is one that physically locks the tool holder into the adaptor and requires an ejection means such as an ejector pin to release the tool holder from the adaptor. In the locking type tool holders and adaptors, the tool holder has a centering cone that mates with a conical recess in the adaptor. In order to get concentricity, the included angle of the centering cone and conical recess are dimensioned so that there is line contact between the centering cone to ensure that the cone and recess mate and have minimal movement with respect to one another. When the tool holder is properly seated it physically is locked along the line contact to ensure the necessary concentricity.

The primary problem with tool holders and adaptors that have locking tapers is the difficulty in changing the tool because the tool holder is locked in the adaptor. In many operations, there is a need to quickly change the tool and having to eject a locked tool holder can be difficult. Many times the operation has to be shut down in order to change the tool resulting in costly delays.

The assignee of the present invention has patented tool holders and spindle adaptors, known as quick change tool and spindle adaptors, which allow the tool holder to be quickly changed. In these tool holders and spindle adaptors, the tool holder does not lock in the spindle adaptor. These quick change tool and spindle adaptors allow tool holders to be rapidly changed but also quickly centered so that the tool remains centered. But, they do not permit the concentricity required in critical precise operations.

One such patent is U.S. Pat. No. 4,710,079 issued Dec. 1, 1987. The patented tool holder and spindle adaptor permits the tool to be quickly changed and substantially aligned with the longitudinal axis of the power rotated spindle. In order to provide for quick change capabilities, the included angle of the centering cone and conical bearing or conical recess are in the range of 40° to 60° and in the preferred embodiment, approximately 50°. This quick change spindle adaptor employs a tapered collar on the tool holder which extends into the body and is retainingly engaged by a series of spaced balls in the body with the balls projecting into engagement with the sleeve tapered wall to retain the tool holder and shank upon the spindle.

Another example of a quick change tool holder assigned to the assignee of the present invention is disclosed in U.S. Pat. No. 4,834,596 issued May 30, 1989. This tool holder employs basically the same included angle between the conical bearing or conical recess and the cone. The difference between this invention and the prior one is in the locking mechanism to lock the tool holder into the spindle for quick change capabilities. In this quick change spindle adaptor, the spindle has a sleeve secured on it and an outer shell which is rotatably mounted upon the sleeve. Spaced threaded segments are formed on the tool holder and are threadably engaged by the nut for axially anchoring the tool holder upon the spindle and for biasing the centering cone into engagement with the spindle bearing.

Although the above two patented inventions provide for the tool holder to be very quickly changed, the preferred 50° included angle between the centering cone and conical bearing allows movement, although slight, of the tool holder shank within the spindle. Because of this slight movement, there is slight angular deflection of the tool holder and the tool mounted thereon with respect to the longitudinal axis of the spindle. This slight amount of deflection is not a problem in most operations, but is a problem in operations which require specific tolerances.

BRIEF SUMMARY OF THE INVENTION

The present invention overcomes the problems encountered with locking-type tapers and the problems of quick releases by providing a quick release spindle and tool adaptor which is capable of maintaining very tight concentricity requirements so that operations performed by the tool are within required tight tolerances.

The tool holder and quick change spindle adaptor of the present invention includes a tool holder having a shank at its inner end axially projected into the axial bore of the spindle adaptor. The tool holder has a free end for receipt of a tool. A conical recess is formed within the inner bore surface of the spindle adaptor at its forward end and defines an axial bearing. A centering cone is positioned around the tool holder intermediate its ends and is dimensioned so that there is snug operative and axial registry with the axial bearing for maintaining an axial self-alignment of the tool holder and spindle adaptor. The recess and cone are configured to mate sufficiently to maintain concentricity to a maximum of 0.0005 inches at a point on the longitudinal center line of the tool holder approximately four inches from the free end of the tool holder. The recess and cone are further configured so that when they register or mate, they do not lock enabling the tool holder to be quickly removed from the spindle adaptor. The ability to achieve the concentricity of the tool while allowing the tool holder to be quickly changed, not locked, is due to the specific dimensions of the included angle of the centering cone and conical recess. Applicant has found that by restricting the included angle of the centering cone to 16° 35′ 39″ plus 0° 0′ 10″ and minus 0° 0′0″ and the conical recess to 16° 35′ 39″ plus 0° 0′0″ and minus 0° 0′ 10″, the improved results are achieved.

It should be appreciated, that the above cone and recess as dimensioned could be used on numerous tool holders and adaptors to allow for quick change capabilities.

BRIEF DESCRIPTION OF THE DRAWINGS

FIG. 1 is a cross-sectional view of the tool holder and quick change spindle adaptor of the present invention.

FIG. 2 is a front view of the tool holder and quick change spindle adaptor of the present invention.

DETAILED DESCRIPTION OF THE INVENTION

The description of the invention is with respect to the preferred quick change spindle adaptor and tool holder with which it will be employed. The preferred tool holder is more clearly described in U.S. Pat. No. 4,834,596 issued on May 30, 1989 and assigned to the assignee of the present invention, T. M. Smith Tool International Corporation. U.S. Pat. No. 4,834,596 is herein incorporated by reference in its entirety. It should be appreciated that, the present invention could be used on other quick change spindle adaptors for tool holders and for example on U.S. Pat. No. 4,710,079 which is also assigned to the assignee of the present application.

With reference to FIG. 1, the tool holder and quick changed spindle adaptor of the present invention is shown generally at 10 attached to a power rotated multiple drill spindle head 14 of a machine tool, shown in phantom. The present quick change spindle adaptor may be used on a single power driven spindle, but it is typically employed in conjunction with high volume multiple spindle machine tools.

Spindle 12 has a longitudinal bore 16 adapted to receive a tool holder 18. The spindle has a longitudinal key way 20 which is adapted to receive a Key 22, normally mounted upon the tool holder.

The spindle 12 includes a conical recess 24 within its inner bore surface at its forward end defining a conical bearing surface. The conical recess 24 opens forwardly and outwardly. The included angle A between opposite sides of the conical bearing is critical to this invention. This will be discussed in greater detail below in relationship to the centering cone on the tool holder 18.

A sleeve 26 is mounted over spindle 12 at its forward end and is secured in position by a radial set screw 28. The set screw 28 extends through a radial aperture 30 in sleeve 26 and is threaded at 32 into spindle 12.

Locking ring 55 secures sleeve 26 on spindle 12 thru angular groove 56 formed within spindle 12.

A pair of annular grooves 34 are formed within sleeve 26 and are adapted to receive locking rings 36. An annular outer shell 38 is rotatably positioned upon sleeve 26 and includes an internal annular flange 40 in engagement with sleeve 26. The opposite sides of the flange are retainingly engaged by the lock rings or snap rings 36. This provides a means of rotatably mounting the outer shell 38 upon sleeve 26 and restraining the outer shell 38 against relative longitudinal movements. The outer shell 38 includes an aperture 39 for access to the set screw 28.

The forward end of the outer shell 38, location 42, is internally threaded at 45 throughout 360°, with the exception of a pair of 180° axial windows 46.

The tool holder assembly is generally indicated at 18. The tool holder 18 includes a chuck assembly for supporting a tool which may be a drill, a reamer, a counter boring tool, etc. The tool holder assembly 18 includes annular body 48 intermediate its ends upon which are arranged a pair of opposed 180° related thread segments 50. Thread segments 50 are adapted for registry with axial windows 46 and with the interior threads 44 of shell 38. As tool holder 18 is assembled into the bore of spindle 12, the corresponding opposed thread segments 50 are axially projected into and through the axial windows 46, thru location 42 of outer shell 38. Tool holder 18 includes an elongated cylindrical shank 52 which extends to one end thereof and is adapted for sliding projection into the forward end of the corresponding bore 16 of spindle 12. Tool holder 18 includes a centering cone 54 which is positioned forwardly of shank 52 and adjacent the annular body 48 and thread segments 50. The centering cone has the same included angle as the conical recess 24 and the two are configured to mate such that there is surface-to-surface contact as opposed to line contact.

The tool holder 18 is inserted into spindle 12 in such a manner that the thread segments 50 are received within the axial windows 46 which results in centering cone 54 of the tool holder 18 abutting conical recess 24. Upon rotation of shell 38, the camming action of the interior threads 44 against the thread segments 50 pull the cone 54 into surface-to-surface contact with recess 24 such that the two abut each other. In order to obtain surface-to-surface contact so that there is virtually no movement between the tool holder 18 and the spindle 12, while at the same time ensuring that the centering cone 54 does not lock within conical recess 24, a preferred included angle A of 16° 35'39" is provided on the centering cone 54 and conical recess 24. As stated above, this included angle A is critical to ensure that there is virtually no deflection of the tool with respect to the longitudinal center line of the tool while still permitting the tool to be quickly changed, i.e., such that the tool holder does not lock in the spindle. In the preferred embodiment, the included angle dimension of the holder 18 has a tolerance of positive 0° 0' 10" to a negative of 0° 0' 0", spindle 12 has a tolerance of a positive 0° 0' 0" to a negative 0° 0' 10". It has been found by Applicant that the preferred included angle held within these tight tolerances provides a quick change adaptor and tool holder which can hold very strict tolerances when operations are being performed, i.e. minimal if any deflection of the tool while at the same time allowing quick changing of the tool holder since the tool holder does not lock within the spindle 12. The concentricity has been found to be about 0.001 inches at a point on the longitudinal center line of the tool holder four inches from the free end of the tool holder.

With the present quick change spindle adaptor, changes in tooling take only seconds, approximately five seconds, as compared to standard methods in critical applications which take up to several minutes at best.

It will be apparent to those skilled in the art that the foregoing disclosure is exemplary in nature rather than limiting, with the invention being limited only by the appended claims:

I claim:

1. A tool holder and quick change spindle adaptor for a power driven spindle having an axial bore and a forward end;
   a tool holder having a shank at its inner end axially projected into said spindle adaptor and a free end for receipt of a tool;
   a conical recess within the inner bore surface at the forward end of said spindle adaptor defining an axial bearing;
   a centering cone on and around said tool holder intermediate its ends in snug operative and axial registry with said axial bearing for maintaining an axial self-alignment of said tool holder and spindle adaptor;

said recess and cone having included angles providing surface contact between said recess and cone, the included angles of said centering cone and said conical recess being 16°35′39″, with the tolerance of said centering cone being plus 0°0′/0″, minus 0°0′0″ and the tolerance of said conical recess being plus 0°0′0″, minus 0°0′/0″, ensuring and maintaining a concentricity of 0.0003 to 0.0005 inches at a point on the longitudinal center line of said tool holder four inches from the free end of said tool holder.

2. The tool holder and quick change spindle adaptor of claim 1, wherein said recess and cone mate without locking so that said tool holder can be quickly removed from said spindle adaptor.

3. The tool holder and quick change spindle adaptor of claim 1, further including a sleeve mounted upon the spindle;
an outer shell rotatably mounted upon said sleeve;
means to retain the shell against longitudinal movement; and
an interior threaded nut upon said shell arranged forwardly of said spindle.

4. The tool holder and quick change spindle adaptor of claim 3, further including threaded means upon said tool holder forwardly of said centering cone, threadably engaged by said nut for axially anchoring said tool holder upon said spindle and for biasing said centering cone into continuous inward engagement and nesting within said spindle adaptor.

5. The tool holder and quick change spindle adaptor of claim 1, further including:
a sleeve mounted upon the spindle;
an outer shell rotatably mounted upon said sleeve;
means to retain the shell against longitudinal movement; and
an interior threaded nut upon said shell arranged forwardly of said spindle;
threaded means upon said tool holder forwardly of said centering cone, threadably engaged by said nut for axially anchoring said tool holder upon said spindle and for biasing said centering cone into continuous inward engagement and nesting within said spindle adaptor.

6. In the quick change spindle adaptor of claim 1, said threaded means including an annular body upon said tool holder forwardly of said centering cone; and
a pair of threaded segments upon said body spaced apart by 180° threadedly received by a nut.

7. In the spindle adaptor of claim 6, wherein said nut has a pair of axial windows spaced apart by 180° to axially receive said threaded segments.

8. In a spindle adaptor and tool holder assembly including a power rotated spindle having a bore and a forward end adapted to receive a tool holder, a sleeve mounted upon the spindle, means to secure the sleeve on the spindle, the tool holder assembly including a tool holder mounting a tool and having a shank at it s inner end slidably projected into the spindle bore, the improvement comprising;
a conical recess within the inner bore surface at the forward end of said spindle defining a conical bearing;
a centering cone upon and around said tool holder forwardly of said shank, in snug and axial registry with said bearing, maintaining an axial self-alignment of said tool holder and spindle;
said recess and cone having included angles providing surface to surface contact between said recess and cone, the included angle of said centering cone and said conical recess being 16°35′39″, with the tolerance of said centering cone being plus 0°0′/0″, minus 0°0′0″, and the tolerance of said conical recess being plus 0°0′0″, ensuring concentricity of said tool holder with respect to said come of 0.0003 to 0.0005 inches at a point on the longitudinal center line of said tool holder four inches from the free end of said tool holder.

9. The tool holder of claim 8, wherein said recess and cone mate without locking such that said tool holder can be quickly removed from said spindle adaptor.

10. The spindle adaptor and tool holder assembly of claim 8, further including,
an outer shell rotatably mounted upon said sleeve;
means to retain the shell against longitudinal movement;
an internally threaded nut upon said shell arranged forwardly of said spindle; and
threaded means upon said tool holder forwardly of said centering cone threadably engaged by said nut for axially anchoring said tool holder upon said spindle and for biasing said centering cone into continuous inward engagement and nesting within said conical bearing.

11. A tool holder and quick change spindle adaptor for a power driven spindle having an axial bore and a forward end;
a tool holder having a shank at its inner end axially projected into said spindle;
a sleeve mounted upon the spindle;
means to secure the sleeve on the spindle;
an outer shell rotatably mounted upon said sleeve;
means to retain the shell against longitudinal movement;
an interiorly threaded nut upon said shell arranged forwardly of said spindle;
cooperating means on said spindle and tool holder for maintaining an axial self-alignment of said tool holder and spindle, said cooperating means comprising a centering cone upon and around said tool holder, forwardly of said shank, in snug and axial registry with a conical bearing defined by a conical recess within the axial bore of said spindle;
wherein said recess and cone having included angles providing surface to surface contact between said recess and cone to ensure concentricity without permitting said cone to lock within said recess;
wherein said included angles are 16°35′39″, the tolerance of said centering cone being plus 0°0′/0″, minus 0°0′0″, and the tolerance of said conical recess being plus 0°0′0″, minus 0°0′/0″;
threaded means upon said tool holder threadedly engaged by said nut on rotation thereof for axially anchoring said tool holder upon said spindle; and
said cooperating means maintaining concentricity such that there is maximum concentric run out of 0.0005 inches at a point on the longitudinal center line of said tool holder four inches from the free end of said tool holder.

12. The tool holder and quick change spindle adaptor of claim 11, wherein said recess and cone register without locking such that said tool holder can be quickly removed from said spindle adaptor.

* * * * *

UNITED STATES PATENT AND TRADEMARK OFFICE
CERTIFICATE OF CORRECTION

PATENT NO. : 5,372,465
DATED : December 13, 1994
INVENTOR(S) : D. F. Smith

It is certified that error appears in the above-indentified patent and that said Letters Patent is hereby corrected as shown below:

Claim 8, column 6, line 7, after "0°0'0"" insert
  --minus 0°0'/0"--

Claim 8, cloumn 6, line 8, after "said", second occurrence
  delete "come" and insert --cone--

Signed and Sealed this

Twenty-first Day of February, 1995

Attest:

BRUCE LEHMAN

*Attesting Officer*     *Commissioner of Patents and Trademarks*